United States Patent [19]

Hehl

[11] 3,980,208
[45] Sept. 14, 1976

[54] FLUIDIZER FOR FEEDING FLOWABLE MATERIAL TO A PRODUCTION MACHINE

[76] Inventor: Karl Hehl, Arthur-Hehl-Strasse 32, 7291 Lossburg, Germany

[22] Filed: Feb. 25, 1975

[21] Appl. No.: 552,750

[30] Foreign Application Priority Data
Feb. 26, 1974 Germany............................ 2409128

[52] U.S. Cl.................................. 222/193; 302/53; 302/57; 302/59
[51] Int. Cl.² ......................................... B65D 83/06
[58] Field of Search................. 222/193; 302/45–47, 302/51, 53, 57, 59

[56] References Cited
UNITED STATES PATENTS

| | | | |
|---|---|---|---|
| 2,932,300 | 4/1960 | Dearsley | 302/59 X |
| 3,134,513 | 5/1964 | Ashman | 222/193 |
| 3,149,884 | 9/1964 | Jones | 302/53 |
| 3,223,456 | 12/1965 | Sonnenschein | 302/53 X |
| 3,524,681 | 8/1970 | Boon | 302/59 |
| 3,708,210 | 1/1973 | Staheli et al. | 302/59 |

FOREIGN PATENTS OR APPLICATIONS

| | | | |
|---|---|---|---|
| 1,729,523 | 5/1972 | Germany | 222/193 |
| 1,215,593 | 4/1966 | Germany | 222/193 |

Primary Examiner—Robert B. Reeves
Assistant Examiner—David A. Scherbel
Attorney, Agent, or Firm—Joseph A. Geiger

[57] ABSTRACT

A device for feeding flowable material, such as plastic granulate to a production machine, e.g. an injection molding machine, the device having a pneumatic granulate conveying line terminating at a feed barrel above the production machine and a bypass line leading through the storage receptacle, thereby automatically diverting the air flow to the bypass line, when the feed barrel is full. Heating of the conveying air makes it possible to dry and preheat the granulate inside the storage receptacle.

17 Claims, 6 Drawing Figures

FLUIDIZER FOR FEEDING FLOWABLE MATERIAL TO A PRODUCTION MACHINE

BACKGROUND OF THE INVENTION

1. Field of the Invention

The present invention relates to devices for feeding flowable raw material to production machines, and more particularly to devices for feeding synthetic plastic material in granular or pulverulent form to injection molding machines at a rate which automatically adjusts itself to the production rate of the injection molding machine.

2. Description of the Prior Art

The prior art in this field includes a known feeding device in which the desired level of material awaiting entry into the plastification unit is maintained automatically by means of electro-mechanical controls which include a rocking lever on a horizontal pivot shaft. One end of the lever is positioned underneath the intake opening of the raw material supply line, while the other end of the lever carries a counter-weight which also serves to electrically control the start and stop of a pneumatic air conveyance system which moves the raw material from a storage receptacle to the plastification unit of the injection molding machine. such a device is disclosed in the German Auslegeschrift (Publ. Allowed Appln.) No. 1,729,523.

SUMMARY OF THE INVENTION

Underlying the present invention is the primary objective of providing an improved device of the above-mentioned type which features an automatic maintenance of the desired material accumulation in a feed barrel above the plastification unit, while being of a simplified design which is more reliable in operation and which can be manufactured at less cost than known prior art devices of this kind.

The present invention proposes to meet this objective by suggesting a feeding device which includes a continuously operating pneumatic conveying system connecting a storage receptacle to a feed barrel which is mounted on top of the plastification unit, the storage receptacle having a wall which, while not being pervious to a raw material, allows pressurized conveying air to pass through at least a portion of that wall and from there into a return line of the air system, or to the atmosphere, while another branch of the air conveying system carries pressurized air and granulate to the feed barrel, where the air is allowed to escape while the granulate accumulates, awaiting entry into the plastification unit. The buildup of a flow resistance in the feed barrel, when the latter becomes progressively fuller, causes an increasingly greater portion of the pressurized air to pass through the storage receptacle, rather than through the raw material supply line, until the latter ceases to convey raw material to the feed barrel. The latter happens, as soon as the air passages of the feed barrel are fully covered with accumulated raw material.

The air conveyance system preferably also includes an air heater, in order to dry and preheat the plastic granulate prior to plastification and injection. The reasons for requiring absolutely dry raw material for injection molding purposes are well known. The additional preheating of the raw material has been found to be very beneficial to the quality of the molded articles, because this heating process takes place very slowly and evenly. This arrangement thus makes it possible to conveniently ascertain the degree of drying of the plastic granulate, as well as the temperature to which the latter is to be heated before and during its conveyance to the plastification unit. This temperature is preferably the highest permissible temperature at which the flowability of the plastic raw material is still maintained.

The preheating of the raw material, besides assuring a more even temperature of the raw material, also brings about a very desirable increase in the productivity of the associated injection molding machine, because the plastification speed in the plastification unit is in most cases a limiting factor in the determination of the maximum cycle speed of the injection molding machine.

An additional advantage of the proposed improved feeding device is the fact that the automatic air bypass system through the granulate receptacle eliminates the need for electro-mechanical or other controls in the device, which feature not only improves it operational reliability, but also greatly reduces its manufacturing and servicing costs.

A preferred embodiment of the invention features a storage receptacle with a double wall, the inner wall having perforations which allow hot air to pass into the receptacle, while preventing granulate from flowing outside. The air thus passing through the storage receptacle returns to the blower of the air circulation system, preferably via a spring-loaded poppet valve. At the bottom end of the storage receptacle is provided a pickup chamber which is supplied with hot air from the blower and communicates in one direction with the space between the storage receptacle walls and in the other direction leads to the entrance of a pneumatic conveying line which runs from the storage receptacle to the feed barrel mounted on the injection unit of the injection molding machine.

The novel feed device can also be conveniently adapted to supply more than one production machine from a common storage receptacle, by simply connecting a pneumatic conveying line for each production machine to the pickup chamber at the bottom of the storage receptacle. One common blower then supplies hot air through its supply line to the pickup chamber where the conveying air stream is subdivided for the various conveying lines, in accordance with the granulate level in each of the feed barrels of the production machines, while the balance of the hot air passes through the storage receptacle and from there back to the air blower, or into the atmosphere.

A preferred embodiment of the feed barrel features a perforated tube length as a terminal portion of the pneumatic conveying line, the plastic granulate being retained in the tube portion, while the conveying air escapes to the atmosphere, as long as at least a portion of the perforated surface is not covered by accumulated raw material granules. This perforated surface is preferably surrounded by a concentrically spaced basket-like filter casing which forms an annular collecting chamber around the tube portion. Any raw material dust that might escape through the perforations of the tube portion is thus collected inside the filter casing. The conveying air flow to the feed barrel can be blocked by means of a rotatable clappet valve arranged in the conveying line upstream of the feed barrel.

The conveying air is preferably heated by means of an electric resistance heater arranged in the supply line leading from the air blower to the pickup chamber of the storage receptacle. The electric controls for this heater may include monitoring means which are responsive to the temperature of the raw material at several crucial locations in the device, so as to shut down the heater, as soon as the temperature in any one of these locations exceeds a predetermined safe level.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows.

DESCRIPTION OF THE PREFERRED EMBODIMENTS

Figure 1:
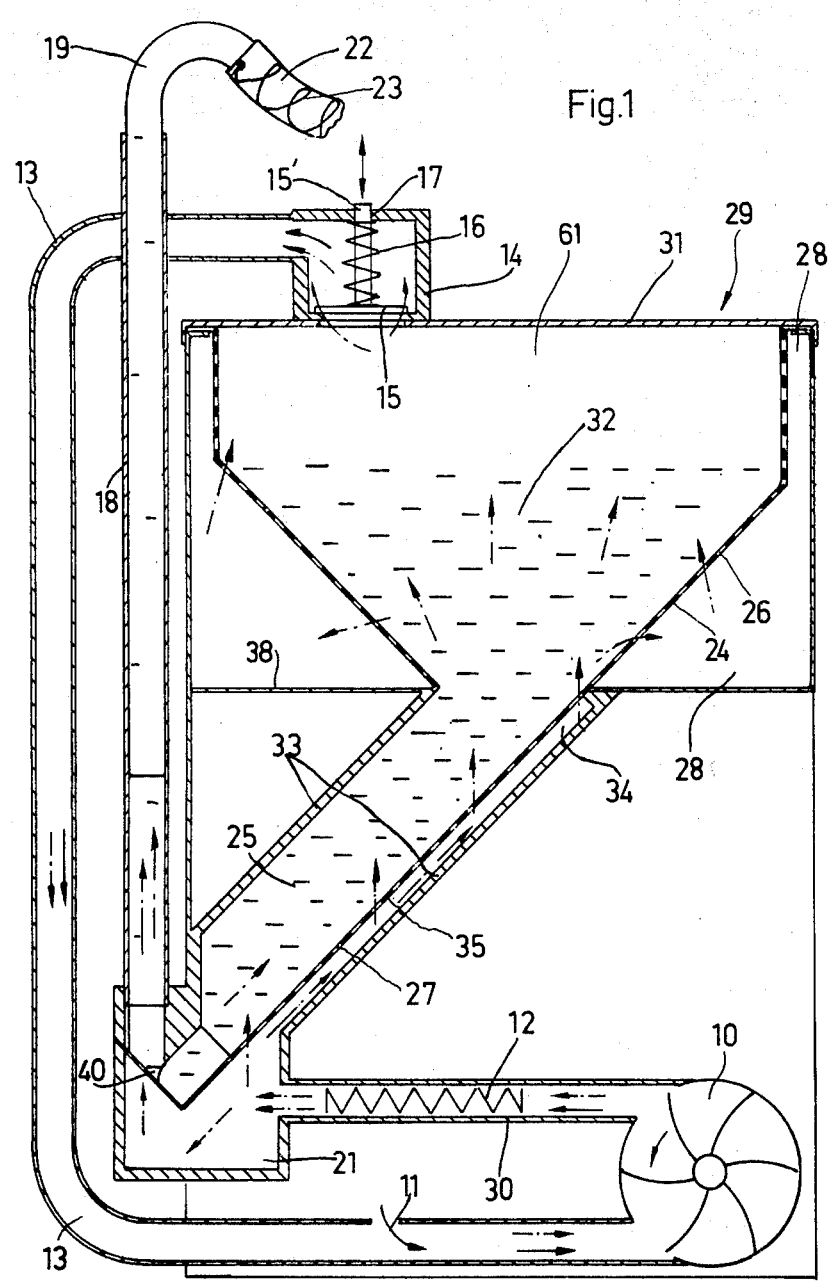
FIG. 1 shows in an elevational cross section a schematically simplified raw material feeding device embodying the invention.
Figure 2:
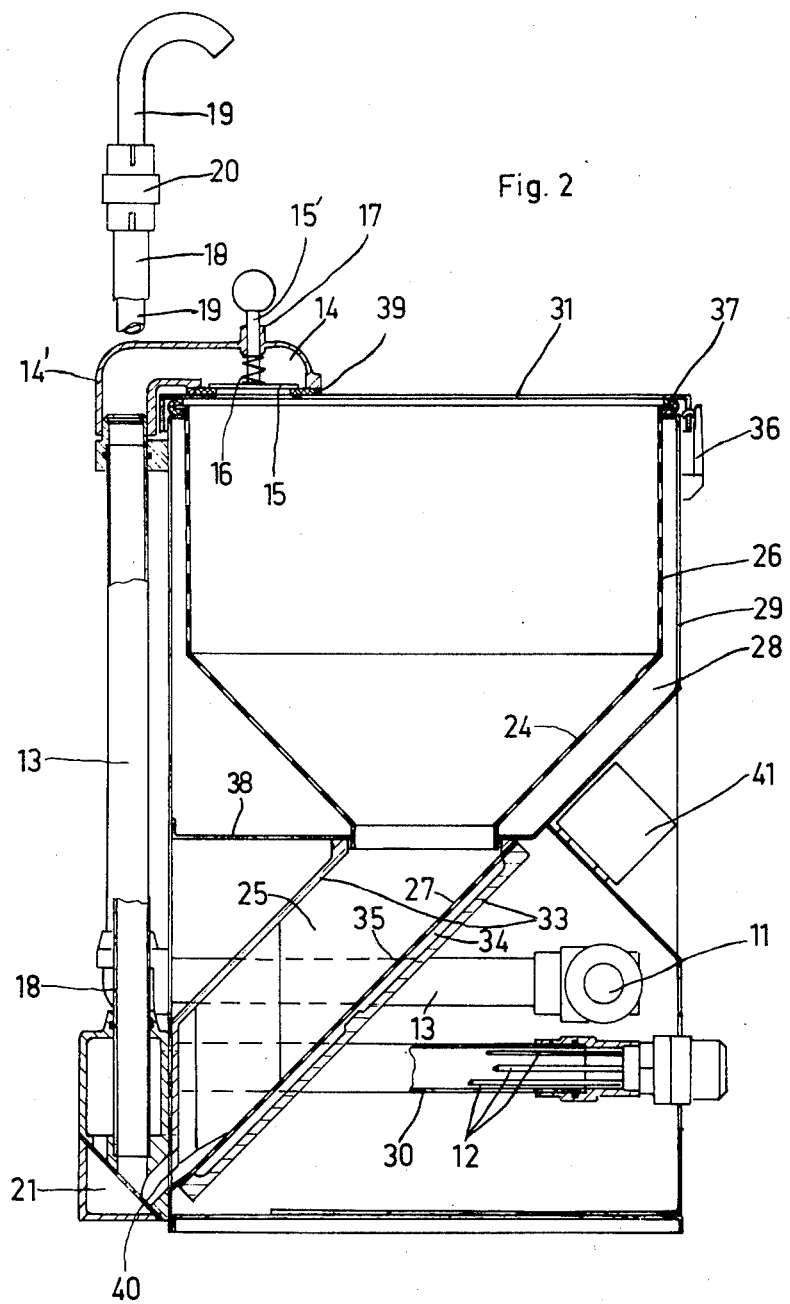
FIG. 2 illustrates the major portions of the storage receptacle and pneumatic conveying system of a feeding device similar to that of FIG. 1.
Figure 3:
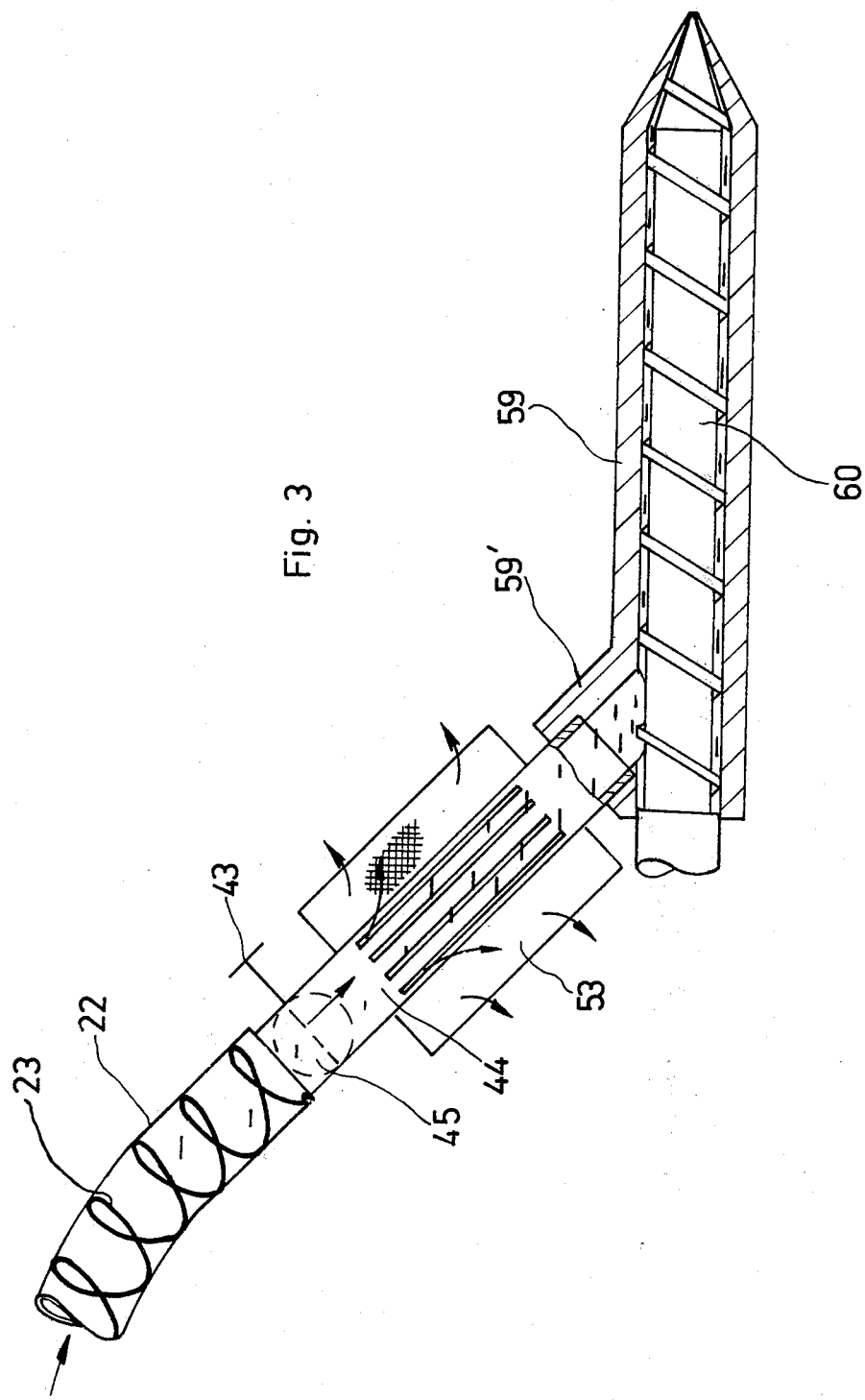
FIG. 3 illustrates schematically the arrangement of a feed barrel in conjunction with the plastification unit of a production machine.

A preferred embodiment of the present invention will now be described with reference to the drawing, in which the embodiment is schematically illustrated in FIGS. 1 and 3, while various constructional details are shown in FIGS. 2 and 4–6.

A storage receptacle 29, as shown in FIG. 1 or in FIG. 2, is designed to hold a large load of flowable raw material, such as granular synthetic plastic, for example. A flexible transparent hose 22 leads from the top of the storage unit (FIG. 1) to a feed barrel 44, which is shown in FIG. 3. This feed barrel sits directly on top of a plastification cylinder 59 inside which a plastification screw 60 rotates. In operation, the inlet connection 59' communicates at all times with the discharge end of the storage receptacle, without an intervening shutoff valve. The feed valve 43 arranged above the feed barrel 44 is only operated, when the feed barrel is to be kept empty, while the storage receptacle and the pneumatic conveying system are in operation. The latter may be the case in an arrangement in which several plastification units are supplied with raw material from a common storage receptacle and where one supply line is being shut off.

The storage unit and pneumatic conveying means of FIGS. 1 and 2 represent basically a pneumatic granulate storing and conveying system with an automatically operating air bypass through the storage receptacle, which becomes operative when the feed barrel (FIGS. 3–6) which is associated with the plastification unit is filled to a predetermined level. The fact that the conveying air can be made to flow through the granulate 32 inside the storage receptacle 29 is taken advantage of to dry and preheat the granulate, by using hot air as the conveying medium. This is done by providing an electric resistance heater 12 inside an air heating line 30 which leads from an air blower 10 to the discharge end of the storage receptacle 29.

In order to realize the aforementioned automatic bypass feature, the invention provides a distributing chamber 21 at the bottom end of the storage receptacle 29, into which the air heating line 20 discharges hot pressurized air. The distributing chamber 21 communicates through air-permeable, but granulate retaining walls with a pickup chamber 40 on the one hand and with the storage receptacle on the other hand, while granulate is allowed to flow into the pickup chamber 40 under the effect of gravity. Thus, given the flow resistance of the air through the granulate inside the receptacle 29, which resistance may be augmented by a spring-loaded poppet valve 14, the conveying air will tend to pass upwardly through the pneumatic conveying line 18 to the feed barrel 44, thereby carrying with it some of the granulate which has accumulated inside the pickup chamber 40. This conveying flow, however, is only possible as long as the conveying air is permitted to escape to the atmosphere through the wall of the feed barrel 44, meaning that, when granulate accumulates inside the feed barrel up to a predetermined level, the air flow therethrough will cease or be slowed to such an extent that the granulate conveyance ceases, in which case the air flow from the distributing chamber 21 is automatically deviated to its bypass route through the storage receptacle 29.

For this purpose, the storage receptacle 29 is arranged in the form of a double-walled hopper, the outer wall of the receptacle serving also as an airtight housing which also accommodates the pneumatic conveying means and associated controls, while inner perforated receptacle walls retain the granular raw material 32. In its upper portion, the receptacle 29 is substantially cylindrical in outline, the open upper end of the receptacle being closable by means of a receptacle cover 31 which includes a gasket 37 and eccentric locks on its periphery. The inner wall 24 of this receptacle portion, forming an intermediate annular space 28 with the outer wall, has a large number of small perforations 26. The tapered funnel portion of the receptacle 29 discharges downwardly into a slanted discharge chute 25 which is similarly provided with a double wall on its lower slanting side, where an inner slanted wall 35 with perforations 27 is spaced parallel from the outer lower chute wall 33 so as to define a hot air channel 34 which communicates with the distributing chamber 21, while the chute 25 itself leads downwardly into the pickup chamber 40. A horizontal separating wall 38 surrounds the junction between the lower end of the funnel portion of the receptacle 29 and the discharge chute 25, so as to separate the annular intermediate space 28 of the receptacle from the hot air channel 34 of the chute.

As a result of this arrangement, the heated air, when forced to travel the bypass route through the granulate receptacle, enters the discharge chute 25 through its perforated slanted inner wall 35, flowing upwardly through the granulate in the chute and through the granulate 32 which is stored in the receptacle 29. There, part of the air will flow upwardly through the granulate 32 into the head space 61 of the receptacle and part of the air will exit laterally into the intermediate space 28, via the perforations of the inner wall 24, reentering into the head space 61 through the perforations of the inner wall at the level of the head space. This arrangement more or less assures that the entire granulate contents of the storage receptacle are evenly preheated, before being conveyed to the production machine, or machines.

A poppet valve 14 mounted on the receptacle cover 31 is arranged to provide a certain resistance against the bypass flow through the storage receptacle, a poppet 15 on a stem 15', surrounded by a valve spring 16 and guided in a bushing 17 being normally closed, but opening automatically under a given air pressure in the head space 61 of receptacle 29. A return line 13 leads from the valve housing 14' to the blower 10. The latter is preferably an impeller-type, radially discharging blower. The return line 13 includes an intake opening 11 through which any air that may have been discharged through the feed barrel 44 is replaced with fresh air. On the other hand, if the need for drying the granulate inside the receptacle 29 requires the transfer of a considerable amount of humidity from the granulate to the hot air, it may be necessary to provide special means for removing that humidity from the returning air, or it may altogether be preferable to discharge the air which exits from the valve housing 14' to the atmosphere, while drawing from the atmosphere all the air that is to be taken in by the blower 10.

The electric resistance heater 12 arranged inside the air heating line 30 of the device is preferably associated with heat monitoring means which will automatically disconnect the heat source, should overheating take place in any one of the monitored locations. A switch box 41 (FIG. 2) accommodates the electric controls for these monitoring means.

The conveyance of granulate from the pickup chamber 40 at the bottom of the storage receptacle 29 to the feed barrel 44 takes place through a pneumatic conveying line which links the former with the latter. This conveying line includes a first vertical pipe section 18 which leads upwardly into an elbow section 19. The latter has a straight extension with which it engages the vertical pipe section 18 in a telescoping connection which can be set to any desired height and orientation by means of a clamping coupling 20 (FIG. 2). The elbow of the elbow section 19 thus represents the highest point in the pneumatic conveying line, so that the granulate can also move to the feed barrel through gravity, via a flexible transparent hose 22. Inside this hose is arranged a wire spiral 23 which serves as a reinforcement of the hose and which also removes any electrostatic charges building up on the transparent hose. The transparency of hose 22 gives the machine operator a convenient way of visually observing the automatic replenishing operation of the feed barrel 44.

Figure 4:
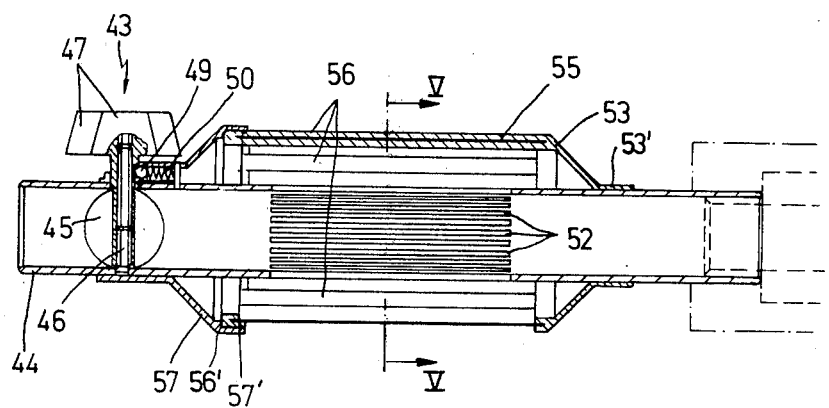
FIG. 4 is a longitudinal cross section through a feed barrel comparable to that which is shown in FIG. 3.
Figure 6:
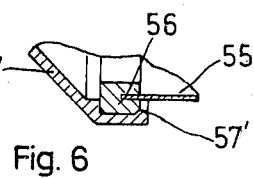
FIG. 6 shows an enlarged cross-sectional detail of FIG. 4.
Figure 5:
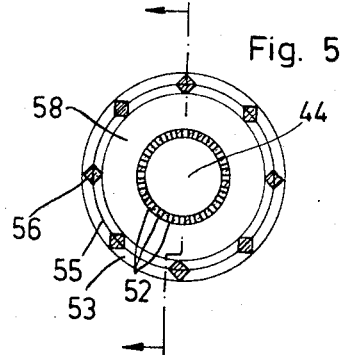
FIG. 5 is a transverse cross section through the feed barrel taken along line V—V of FIG. 4.

The feed barrel 44 of FIG. 3, illustrated in greater detail in FIGS. 4–6, consists essentially of a cylindrical tube portion which, over a certain length, is provided with a number of longitudinal exit slits 52 through which the conveying air escapes radially from the barrel, while the granular raw material is retained inside. The feed barrel 44 is concentrically surrounded by a cylindrical filter screen 55, preferably a metal screen, which forms an annular collecting chamber 58 around the feed barrel 44. Raw material dust which is carried with the conveying air and which may escape through the slits 52 of the feed barrel 44 is thus collected inside the chamber 58. The cylindrical filter screen 55 itself is carried by a filter basket 53, the filter screen being imbedded inside a number of parallel, angularly spaced supporting ribs 56 of the basket, the ribs extending axially from a flange portion which engages the outside diameter of the feed barrel 44 by means of a smaller flange collar 53'. The far ends of the supporting ribs 56 are circumferentially linked together by means of an end ring 56' which in turn is engaged by a matching end flange 57 whose snap rim 57' provides for a convenient opening and closing procedure of the collecting chamber. The end flange 57 has a flange collar which is similar to collar 53'. With it, it engages the outer diameter of the feed barrel 44. The collar of end flange 57 also accommodates an air valve 43 which consists of a valve clappet 45 on a shaft 46, the latter being rotatable by means of a valve knob 47. A detent ball 49 and spring 50 retain the air valve in the fully open position. This valve is normally open, but can be closed, if the supply of granulate to this particular feed barrel is to be stopped, while the automatic feeding device continues in operation, supplying other production machines with plastic granulate.

In operation, the pressurized heated conveying air will first tend to pass through the conveying line, consisting of elements 18, 19 and 22, into and through the feed barrel 44, in view of the fact that the bypass route through the storage receptacle 29 is blocked by the poppet valve 14. Thus, the hot air will convey granulate material into the feed barrel 44, until its exit slits 52 are covered by accumulated raw material to such an extent that the air flow speed is no longer high enough to carry granulate up through the elbow section 19. This also means that the resistance against the air flow through the conveying line has been progressively increasing to a point where the pressurized air has built up sufficient pressure inside the head space 61 of the receptacle 29 to open the poppet valve 14 for a bypass flow through the receptacle into the return line 13. This means that as soon as the granulate accumulation inside the feed barrel 44 has reached a predetermined level, the supply of further granulate is automatically stopped without any moving parts intervening in the operation, other than the opening of the spring-loaded poppet valve 14 on the storage receptacle 29. As the plastification unit admits new raw material through air-pressure assisted gravity discharge from the feed barrel 44, the longitudinal exit slits 52 of the latter are again partially exposed so that the flow of conveying air through the slits is allowed to increase to a point where it will carry with it a certain amount of plastic granulate.

The proposed device not only operates fully automatically, under any production rate, it also supplies evenly preheated granulate to the plastification unit. The resistance heater 12 in the air heating line 30 is preferably adjustable for any desired heat output, so that the temperature to which the granular raw material is preheated can be set just below a temperature at which the flowability of the material would be unacceptably reduced. For raw material of very small granular size, it may be desirable to provide a feed barrel 44 with a fine-mesh screen, rather than one with longitudinal exit slits as shown in FIG. 4.

The automatic drying and preheating of the plastic raw material in the feed device of the invention has been found to noticeably improve the quality and uniformity of the molded particles. It also makes it possible to increase the plastification speed in the plastification unit which is frequently a crucial factor determining the operating speed of the production machine. Prior art granulate drying systems have been known to cause fires, when the air blower or ventilator would stop operating properly. Such fires are no longer possible with the present device, because the heater element 12 in the air heating line 30 of the pneumatic conveying system is automatically shut down, as soon as the temperature exceeds a control value in any one of several monitored places of the device.

The storage receptacle 29 can be replenished by removing its cover 31 which is held in place by the quick-release eccentric locks 36. Any material accumulated inside the collecting chamber 58 of the feed barrel 44 can be removed therefrom by simply axially separating the filter basket 53 from the end flange 57 in a snap action. The filter basket than slides axially on the outer diameter of the feed barrel 44.

It should be understood, of course, that the foregoing disclosure describes only a preferred embodiment of the invention and that it is intended to cover all changes and modifications of this example of the invention which fall within the scope of the appended claims.

I claim the following:

1. A device for feeding flowable material to a production machine, which device is particularly suitable for feeding plastic granulate to an injection molding machine, while being adaptable for drying and preheating of the granulate, the device comprising in combination:
    a receptacle holding a supply of material ready for feeding to the production machine, said receptacle having a discharge opening;
    a pneumatic material conveying unit including means for generating a flow of compressed air and a pneumatic material conveying line connected thereto;
    a pickup chamber in the pneumatic conveying line communicating with the discharge opening of the receptacle so as to admit flowable material into the conveying line for transportation by the air flow toward the production machine;
    a feed barrel connected to one end of the pneumatic conveying line at a distance from said receptacle, said barrel communicating with the production machine for delivery of the conveyed material thereto, while being adapted to accumulate said material therein until such delivery; the feed barrel having a wall portion that is permeable to air while retaining the accumulated material in the manner of a sieve, thus allowing the air flow to exit from the conveying line at this point; and
    a bypass flow channel connected to the pneumatic conveying line upstream of the feed barrel so as to allow the pressurized air to exit therefrom, the bypass channel having a flow resistance therein which allows the air flow to pass only when, through the coverage of at least a major portion of the air-permeable wall of the feed barrel with accumulated material, the exit of air through the feed barrel encounters a flow resistance which is as high or higher than the flow resistance in the bypass channel.

2. A material feeding device as defined in claim 1, wherein:
    said receptacle is a storage receptacle holding therein plastic raw material in granular form for feeding to at least one production machine;
    the interior space of the storage receptacle occupied by said granulate is part of the bypass flow channel, so that the bypassing air flow is forced to travel through the stored granulate, which latter thereby constitutes at least a portion of said bypass flow resistance; and
    the pneumatic material conveying unit includes means for heating the compressed air which it supplies to the pneumatic conveying line, so that the air flow serves to dry and to preheat both the granulate under conveyance and the granulate which is held in the storage receptacle.

3. A material feeding device as defined in claim 2, wherein:
    that part of the production machine with which the feed barrel communicates is a plastification unit; and
    the feed barrel discharges the plastic granulate directly into the plastification unit through the combined effect of gravity and air pressure against the accumulated granulate.

4. A material feeding device as defined in claim 2, further comprising
    a spring-loaded shutoff valve in the bypass flow channel serving to increase the flow resistance therein, by opening only when a predetermined air pressure is established in the material conveying line and in the bypass channel portion upstream of the shutoff valve.

5. A material feeding device as defined in claim 2, wherein:
    the discharge opening of the receptacle is located near its lowest point for gravity discharge of the material therethrough;
    the storage receptacle includes a lower receptacle portion with a perforate wall portion reaching at least close to its discharge opening, said wall portion being permeable to air, but capable of retaining the granulate;
    said perforate wall portion also constitutes a wall of a hot air channel through which the bypassing air flow enters the receptacle;
    the pneumatic conveying line further includes a distributing chamber located upstream of the pickup chamber; and
    the hot air channel communicates with the distributing chamber, thereby constituting a first portion of the bypass channel.

6. A material feeding device as defined in claim 5, wherein:
    said lower portion of the storage receptacle is a discharge chute;
    the perforate wall of the lower receptacle portion is a downwardly slanting wall on the discharge chute; and
    the hot air channel is a similarly slanting channel adjoining the slanting wall of the discharge chute from below.

7. A material feeding device as defined in claim 6, wherein:
    the storage receptacle has an enlarged upper receptacle portion which is formed by a wall of which at least a major portion is likewise perforate, allowing air to pass therethrough while retaining the granulate, the upper receptacle portion having wall portions which converge toward the discharge chute;
    the receptacle further includes an outer wall sealingly enclosing the perforate wall area of the upper receptacle portion, so as to define an intermediate flow space between the perforate receptacle wall and said outer wall into which the bypassing air can escape from the granulate and from which it can reenter the upper receptacle portion above the granulate, if the level of granulate is such that a head space remains above it.

8. A material feeding device as defined in claim 7, wherein:
the upper receptacle portion has a cylindrical section above its converging wall portions;
the outer receptacle wall is likewise cylindrical so as to define an annular intermediate flow space inside of it; and
the receptacle further includes a separating wall at the level of the junction between the upper and lower receptacle portions, which separating wall forms a bottom for the intermediate flow space; and wherein
the device further comprises a hermetically closable receptacle cover with an exit opening for the by-pass air flow.

9. A material feeding device as defined in claim 2, wherein:
the feed barrel has a tubular length portion provided with perforations in its wall, which thus constitute said air-permeable wall portion; and
the device further includes a filter basket surrounding said tubular length portion of the feed barrel so as to form a collecting chamber for the collection of small particles that might escape with the conveying air through the aforementioned perforations.

10. A material feeding device as defined in claim 9, wherein
the perforations in the feed barrel wall are narrow, longitudinally extending radial slits in said wall.

11. A material feeding device as defined in claim 9, wherein:
the filter basket includes:
a series of parallel, angularly spaced and axially extending supporting ribs attached to a flange collar with which the filter basket sealingly engages the feed barrel from the outside;
a substantially cylindrically shaped fine-mesh metallic filter screen carried by the supporting ribs; and
a removable end flange on the axially opposite end of the flange collar.

12. A material feeding device as defined in claim 11, wherein:
the supporting ribs and the flange collar of the filter basket are integral portions of an injection molded part, including further an end ring at one end of the supporting ribs;
the removable end flange is likewise injection molded and includes a peripheral snap rim adapted to cooperate with said end ring to define a snap connection; and
the filter screen is partially imbedded in the supporting ribs.

13. A material feeding device as defined in claim 2, wherein:
the air flow generating means for the pneumatic material conveying unit is a blower;
the heating means of the pneumatic material conveying unit includes an adjustable electric resistance heater arranged between the blower and the junction between the storage receptacle and the conveying line, including means for monitoring the temperature level at a plurality of locations in the device to guard against excessive heat development.

14. A material feeding device as defined in claim 13, wherein
the bypass flow channel includes a return line leading from the storage receptacle to the intake of the blower.

15. A material feeding device as defined in claim 2, wherein:
the pneumatic conveying line includes:
an upwardly oriented first conveying line portion which includes a straight pipe section;
an elbow portion having a matching straight pipe section engaging the straight pipe section of the first line portion in a telescopic engagement;
clamping means for setting said telescopic engagement in various angular and height positions; and
a third line portion leading from the elbow portion to the feed barrel.

16. A material feeding device as defined in claim 15, wherein:
the elbow portion of the pneumatic conveying line constitutes the highest point of said line; and
the third line portion is a transparent flexible hose with a metallic spiral imbedded in its wall for the removal of electrostatic charges therefrom.

17. A material feeding device as defined in claim 1, further comprising:
in the pneumatic material conveying unit, at least one additional material conveying line for the supply of flowable material to more than one place; all material conveying lines communicating with the pickup chamber of the receptacle;
an additional feed barrel connected to one end of each additional material conveying line at a distance from said receptacle; and
an air valve in each material conveying line upstream of the feed barrel for the selective interruption of the material supply to any one of the feed barrels.

* * * * *